(12) United States Patent
Kobayashi (10) Patent No.: US 9,820,211 B2
(45) Date of Patent: Nov. 14, 2017

(54) WIRELESS COMMUNICATION RELAY APPARATUS, AUTOMATIC RESPONSE METHOD IN WIRELESS COMMUNICATION RELAY APPARATUS, AND NON-TRANSITORY COMPUTER READABLE MEDIUM

(71) Applicant: NEC Platforms, Ltd., Kawasaki-shi, Kanagawa (JP)

(72) Inventor: Takahiro Kobayashi, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/323,155

(22) PCT Filed: Jul. 27, 2016

(86) PCT No.: PCT/JP2016/003482
§ 371 (c)(1),
(2) Date: Dec. 30, 2016

(87) PCT Pub. No.: WO2017/037998
PCT Pub. Date: Mar. 9, 2017

(65) Prior Publication Data
US 2017/0201927 A1     Jul. 13, 2017

(30) Foreign Application Priority Data
Sep. 3, 2015  (JP) .................................. 2015-173810

(51) Int. Cl.
*H04W 40/22* (2009.01)
*H04W 12/06* (2009.01)
*H04W 4/00* (2009.01)

(52) U.S. Cl.
CPC ........... *H04W 40/22* (2013.01); *H04W 4/008* (2013.01); *H04W 12/06* (2013.01); *H04M 2207/187* (2013.01)

(58) Field of Classification Search
CPC ..... H04W 40/22; H04W 4/008; H04W 12/06; H04W 88/08; H04W 88/12; H04M 1/72505; H04M 1/7253; H04M 2250/02
(Continued)

(56) References Cited

U.S. PATENT DOCUMENTS

2003/0008612 A1    1/2003  Andreason
2010/0002684 A1    1/2010  Chun
(Continued)

FOREIGN PATENT DOCUMENTS

JP    2005-110051 A    4/2005
JP    2010-124431 A    6/2010
(Continued)

OTHER PUBLICATIONS

Communication dated Feb. 2, 2017, from the Canadian Intellectual Property Office in counterpart Application No. 2,952,130.
(Continued)

*Primary Examiner* — Keith Ferguson
(74) *Attorney, Agent, or Firm* — Sughrue Mion, PLLC (57) ABSTRACT

A wireless communication relay apparatus (10) according to the present invention outputs, when there is an incoming call from a base station (30) (YES in Step S1) and the connection authentication between the wireless communication relay apparatus (10) and the wireless communication terminal (20) has not yet been completed (NO in Step S2), an instruction to start the connection authentication to the user as an in-apparatus incoming notification state (Step S21) and sends a message or a hold tone indicating that the connection authentication is currently being executed to a caller of the
(Continued)

incoming call (Step S26). After that, when the connection authentication is completed (YES in Step S28), the incoming call is connected to the wireless communication terminal (20) (Step S3).

10 Claims, 4 Drawing Sheets

(58) Field of Classification Search
USPC ....... 455/7, 11.1, 410, 411, 422.1, 403, 500, 455/517, 550.1, 426.1, 426.2, 4, 455/14.1–414.4, 466, 450, 509, 508, 507; 370/310, 315, 328, 329, 338, 252, 351, 370/354, 355, 356
See application file for complete search history.

(56) References Cited

U.S. PATENT DOCUMENTS

2010/0128707 A1   5/2010   Horio et al.
2011/0085650 A1*  4/2011   Cheon ............... H04M 3/42042
                                                379/142.05

FOREIGN PATENT DOCUMENTS

| | | |
|---|---|---|
| JP | 2011-103542 A | 5/2011 |
| JP | 2012-213100 A | 11/2012 |
| JP | 2013-257227 A | 12/2013 |

OTHER PUBLICATIONS

Japanese Decision to Grant a Patent of Japanese Application No. 2015-173810 dated Aug. 23, 2016.
International Search Report of PCT/JP2016/003482 dated Aug. 30, 2016.

* cited by examiner

WIRELESS COMMUNICATION RELAY APPARATUS, AUTOMATIC RESPONSE METHOD IN WIRELESS COMMUNICATION RELAY APPARATUS, AND NON-TRANSITORY COMPUTER READABLE MEDIUM

CROSS REFERENCE TO RELATED APPLICATIONS

This application is a National Stage of International Application No. PCT/JP2016/003482, filed Jul. 27, 2016, claiming priority based on Japanese Patent Application No. 2015-173810, filed Sep. 3, 2015, the contents of all of which are incorporated herein by reference in their entirety.

TECHNICAL FIELD

The present invention relates to a wireless communication relay apparatus, an automatic response method in the wireless communication relay apparatus, and a non-transitory computer readable medium that stores an automatic response program.

BACKGROUND ART

In recent years, there have been remarkable developments in the field of mobile wireless communications and now wireless communications can be performed regardless of time and place. As disclosed in Patent Literature 1 (Japanese Unexamined Patent Application Publication No. 2012-213100, titled "Telephone System, Mounting Device, Terminal Device, Switching Device, and Device Connection Method for Telephone System") and Patent Literature 2 (Japanese Unexamined Patent Application Publication No. 2013-257227, titled "Automatic Response Apparatus, Automatic Response Relay Apparatus, Automatic Response Communication System, Automatic Response Method, and Automatic Response Program", for example, even when a user is walking or moving by a moving body such as a vehicle, wireless communication via a base station or a mobile wireless communication relay apparatus (e.g., a mobile router) can be achieved.

Such a wireless communication relay apparatus called a mobile router or the like wirelessly relays a voice call or a Voice over Internet Protocol (VoIP) call from a base station to a wireless communication terminal. Since such a wireless communication relay apparatus alone does not have a function of communicating with a caller, the wireless communication relay apparatus alone cannot perform a voice call or a VoIP call even when it receives a phone call from the caller via the base station. When the wireless communication relay apparatus receives the phone call from the caller via the base station, the wireless communication relay apparatus notifies the wireless communication terminal, which is the relay destination, that there is an incoming call. Then the wireless communication terminal that has received the notification regarding the incoming call from the wireless communication relay apparatus picks up (goes off hook), responds to the incoming call, and starts communication via the base station and the wireless communication relay apparatus.

CITATION LIST

Patent Literature

[Patent Literature 1] Japanese Unexamined Patent Application Publication No. 2012-213100

[Patent Literature 2] Japanese Unexamined Patent Application Publication No. 2013-257227

SUMMARY OF INVENTION

Technical Problem

However, when the connection authentication between the wireless communication relay apparatus and the wireless communication terminal has not yet been completed, even when there is an incoming call for the wireless communication relay apparatus, the wireless communication relay apparatus cannot transmit the notification indicating that there is an incoming call to the wireless communication terminal and the wireless communication terminal cannot immediately pick up the call, and the calling party has to wait for some time until the time the connection authentication is completed and the called party is in the on-call state.

Accordingly, in related art, when the connection authentication between the wireless communication relay apparatus and the wireless communication terminal has not yet been completed when there is an incoming call, the wireless communication relay apparatus typically sends a busy signal to the calling party as a busy process or plays back a message indicating that the called party is absent to the caller or executes processing to allow the caller to leave messages as an automatic response to the incoming call. As a result, the caller needs to perform an operation of making a call again or the called party calls the caller back, which takes time and trouble. Further, the operation of making a call again by the caller and the operation of calling the caller back by the called party may require extra communication costs.

In order to avoid the aforementioned circumstances, according to the techniques disclosed in Patent Literature 1 and 2, when the connection authentication between the wireless communication relay apparatus and the wireless communication terminal has not yet been completed when there is an incoming call, the calling party can wait for a completion of the connection authentication and a delivery of an incoming call response from the wireless communication terminal. However, the longer the waiting time is, the higher the probability is that the calling party may abandon and disconnect the incoming call without waiting for a response from the called party, which results in loss of the communication opportunities.

That is, in Patent Literature 1, the mounting device, which is the wireless communication relay apparatus, and the mobile telephone terminal, which is the wireless communication terminal, perform pairing (connection authentication) using a Bluetooth (BT (registered trademark)) system, which is one of near-field wireless communication techniques. Although Patent Literature 1 discloses responding to an incoming call by the mounting device when the pairing between the mounting device and the mobile telephone terminal has not yet been established, Patent Literature 1 discloses nothing about connecting the incoming call to the mobile telephone terminal after the pairing between the mounting device and the mobile telephone terminal is completed to achieve the voice communication between the caller and the mobile telephone terminal. Further, although Patent Literature 1 discloses that, in some cases, the mounting device responds to the incoming call when the pairing between the mounting device and the mobile telephone terminal has not yet been established and the incoming call is forwarded to the mobile telephone terminal, the system disclosed in Patent Literature 1 does not connect the incoming call after the pairing.

Further, although Patent Literature 2 discloses sending a response message as an automatic response to an incoming call when there is an incoming call while a user is using public transportation, Patent Literature 2 discloses nothing about sending a primary response to an incoming call when there is an incoming call during the connection authentication procedure or bringing the incoming call into a communication state after the completion of the connection authentication.

That is, when there is an incoming call in a state in which the connection authentication between the wireless communication relay apparatus and the wireless communication terminal is completed in advance and the wireless communication is ready to start, the re-connection time between the wireless communication relay apparatus and the wireless communication terminal regarding this incoming call can be reduced and the called party can be informed that there is an incoming call without keeping the caller waiting. On the other hand, when there is an incoming call from the caller in a state in which the connection authentication between the wireless communication relay apparatus and the wireless communication terminal is not completed in advance, the user of the wireless communication relay apparatus and the wireless communication terminal needs to operate these devices to execute a mutual connection authentication, which requires at least a few seconds. While the connection authentication between the wireless communication relay apparatus and the wireless communication terminal is being executed, the wireless communication terminal that includes the communication function cannot immediately respond to the incoming call from the caller.

As stated above, in the aforementioned system according to related art, unless the connection authentication between the wireless communication relay apparatus and the wireless communication terminal is completed, when there is an incoming call from the caller, the called party cannot immediately respond to the incoming call and the caller has to wait for some time. Accordingly, in some cases, even when the user of the wireless communication relay apparatus and the wireless communication terminal is present near these devices and is able to immediately start the operation of the connection authentication, the calling party, which does not know the state of the called party, may determine that the called party is absent and abandon and disconnect the incoming call without waiting for a response by the called party, which results in the loss of communication opportunities.

Object of Present Invention

The present invention has been made in view of the aforementioned circumstances and aims to provide a wireless communication relay apparatus, and an automatic response method and an automatic response program in the wireless communication relay apparatus capable of avoiding the situation in which the caller abandons and disconnects the incoming voice call or VoIP call for the wireless communication terminal as an incomplete call without waiting for a response by the called party even in a state in which a connection authentication between the wireless communication relay apparatus that relays the voice call or the VoIP call and the wireless communication terminal that is supposed to receive the incoming call has not yet been completed.

Solution to Problem

In order to solve the aforementioned problems, the wireless communication relay apparatus, the automatic response method in the wireless communication relay apparatus, and the non-transitory computer readable medium storing the automatic response program mainly employ the following characteristic configurations.

(1) A wireless communication relay apparatus according to the present invention includes:

a wireless communication function that performs a wireless communication with a base station, a near-field wireless communication function that performs a near-field wireless communication with a wireless communication terminal arranged nearby, and a function that relays a call between the base station and the wireless communication terminal, the wireless communication relay apparatus further including:

a function of outputting, when there is an incoming call from the base station and a connection authentication between the wireless communication relay apparatus and the wireless communication terminal has not yet been completed, an instruction to start the connection authentication to a user and sending a message or a hold tone indicating that the connection authentication is currently being executed to a caller of the incoming call as a primary response to the incoming call; and a function of connecting, after the connection authentication is completed, the incoming call to the wireless communication terminal and transmitting a response indicating that the communication is now ready to start to the caller when the wireless communication terminal has gone off hook.

(2) An automatic response method in a wireless communication relay apparatus according to the present invention includes:

a wireless communication step for performing a wireless communication with a base station;

a near-field wireless communication step for performing a near-field wireless communication with a wireless communication terminal arranged nearby; and a step of relaying a call between the base station and the wireless communication terminal, the automatic response method further including:

a step of outputting, when there is an incoming call for the wireless communication relay apparatus from the base station and the connection authentication between the wireless communication relay apparatus and the wireless communication terminal has not yet been completed, an instruction to start the connection authentication to a user and sending a message or a hold tone indicating that the connection authentication is currently being executed to a caller of the incoming call as a primary response to the incoming call; and a step of connecting, after the connection authentication is completed, the incoming call to the wireless communication terminal and transmitting a response indicating that the communication is now ready to start to the caller when the wireless communication terminal has gone off hook.

(3) A non-transitory computer readable medium according to the present invention stores an automatic response program that executes the automatic response method in the wireless communication relay apparatus according to the above (2) as a program that can be executed by a computer.

Advantageous Effects of Invention

According to the wireless communication relay apparatus, the automatic response method and the automatic response program in the wireless communication relay apparatus, when there is an incoming call from the caller and the connection authentication between the wireless communication relay apparatus and the wireless communication terminal has not yet been completed, the wireless communication relay apparatus instructs the user of the wireless communication relay apparatus to start the connection authentication operation between the wireless communication relay apparatus and the wireless communication terminal by a state display that uses a light-emitting diode (LED) or a liquid crystal display (LCD) or vibrations of a body of the wireless communication relay apparatus and the wireless communication relay apparatus sends a message or a hold tone indicating that the connection authentication processing is being performed to the caller of the incoming call as a primary response to the incoming call. Therefore, the following effects can be obtained.

When there is an incoming call for the wireless communication terminal from the caller in a state in which the connection authentication by the near-field wireless communication has not yet been performed between the wireless communication relay apparatus and the wireless communication terminal, which is supposed to be the relay destination of a voice call or a VoIP call, or the connection authentication is currently being executed, the probability that the caller may perform the operation of abandoning and disconnecting the incoming call without waiting for a response by the called party can be reduced, whereby it is possible to prevent the loss of the communication opportunities as much as possible.

DESCRIPTION OF EMBODIMENTS

Hereinafter, with reference to the accompanying drawings, a preferred embodiment of a wireless communication relay apparatus, and an automatic response method and an automatic response program in the wireless communication relay apparatus according to the present invention will be described. While the wireless communication relay apparatus and the automatic response method in the wireless communication relay apparatus according to the present invention will be described in the following description, it is needless to say that the automatic response method in the wireless communication relay apparatus may be executed as the automatic response program that can be executed by a computer or the automatic response program may be recorded in a storage medium that can be read out by a computer. Further, it is needless to say that the reference symbols are attached to the accompanying drawings for the purpose of facilitating understanding of the present invention and the present invention is not limited to the aspect shown in the drawings.

Features of Present Invention

Prior to the description of an embodiment of the present invention, an outline of the features of the present invention will be described first. The present invention relates to a wireless communication relay apparatus including a voice originating/incoming function and a wireless relay function that relays an incoming voice call or VoIP call to a wireless communication terminal that includes a communication function. When there is an incoming voice call or VoIP call and a connection authentication between the wireless communication relay apparatus and the wireless communication terminal, which is the relay destination, has not yet been completed, the wireless communication relay apparatus outputs an instruction to start the connection authentication between the wireless communication relay apparatus and the wireless communication terminal, which is the relay destination, to a user of the wireless communication relay apparatus and sends a message or a hold tone indicating that the connection authentication is currently being executed to the caller as a primary response. When the connection authentication is completed, the wireless communication relay apparatus connects the incoming voice call or VoIP call to the wireless communication terminal to send a response indicating that the communication is now ready to start to the caller. Accordingly, when there is an incoming call, even when the connection authentication between the wireless communication relay apparatus and the wireless communication terminal, which is the relay destination, has not yet been executed, the wireless communication relay apparatus definitely performs the connection authentication with the wireless communication terminal and sends the primary response to the caller so that the caller will wait for some time until the connection authentication is completed, whereby it is possible to avoid the situation in which the caller abandons and disconnects the call without waiting for a response from the called party as much as possible and to definitely reduce the number of incomplete calls.

Configuration Example of Embodiment

Figure 1:
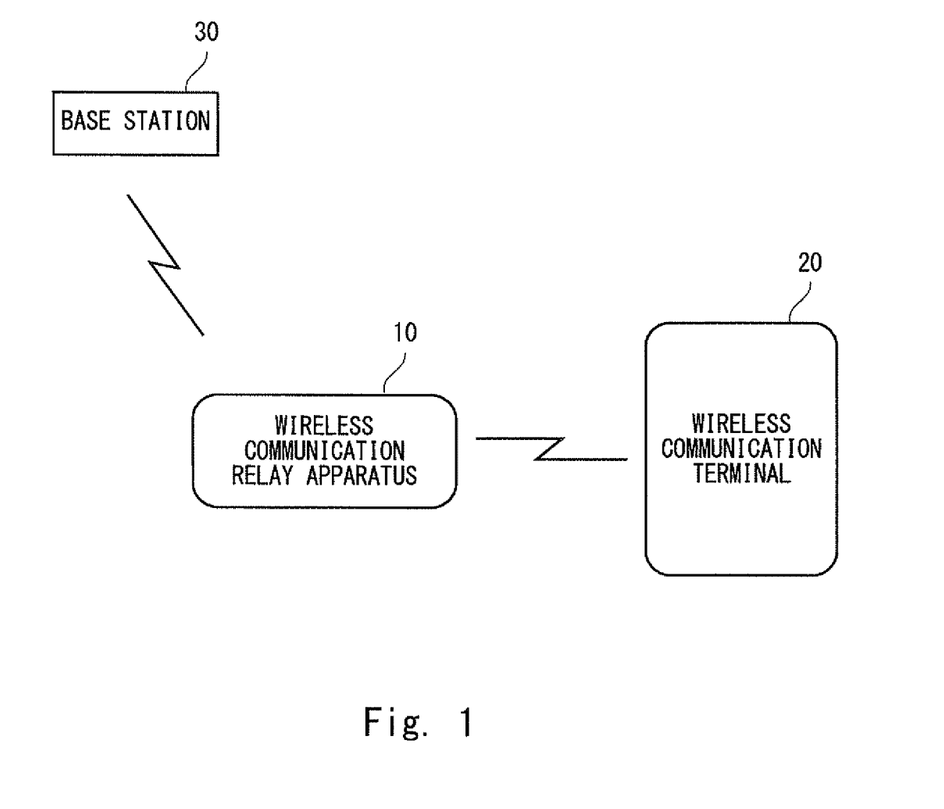
FIG. 1 is a schematic configuration diagram showing one embodiment of a configuration example of a wireless relay system that uses a wireless communication relay apparatus and a wireless communication terminal according to the present invention.

Next, with reference to the drawings, a configuration example of a wireless communication relay apparatus according to one embodiment of the present invention will be described in detail. FIG. 1 is a schematic configuration diagram showing one embodiment of a configuration example of a wireless relay system including a wireless communication relay apparatus and a wireless communication terminal according to the present invention. In the wireless relay system shown in FIG. 1, a wireless communication relay apparatus 10 includes a wireless communication function performed by a personal handy-phone system (PHS) system, a wireless local area network (LAN) system, a wideband-code division multiple access (W-CDMA) system, a long term evolution (LTE) system, a worldwide interoperability for microwave access (WiMAX) system or the like and performs wireless communication with a base station 30. The wireless communication relay apparatus 10 further includes a near-field wireless communication function performed by a Bluetooth (BT (registered trademark)) system, a ZigBee system, a wireless local area network (LAN) system or the like and performs near-field wireless communication with a wireless communication terminal 20 arranged nearby. The wireless communication relay apparatus 10 further includes a wireless relay function that relays an incoming/outgoing call between the base station 30 and the wireless communication terminal 20 that uses wireless signals and performs a connection authentication using an authentication number called a personal identification number (PIN) code in order to establish the connection between the wireless communication relay apparatus 10 and the wireless communication terminal 20 when performing the wireless communication between the wireless communication relay apparatus 10 and the wireless communication terminal 20.

The wireless communication relay apparatus 10 may either be a mobile communication apparatus or a fixed communication apparatus. Further, a signal to be relayed in the present invention is not limited to a voice and may be data such as a text, a video, or an image. While the case where the incoming call that is relayed from the wireless communication relay apparatus 10 to the wireless communication terminal is the incoming call for a voice call will be described as an example in the following description of the embodiment, the incoming call may be a communication incoming call for data communication. Further, when the incoming call is the incoming call for a voice call, the incoming call may be an incoming call by a circuit switch based voice call or may be an incoming call based on a packet communication such as a Voice over Internet Protocol (VoIP), a Voice over Frame Relay (VoFR), or a Voice over ATM (VoA) in which voice signals are packetized.

Figure 2:
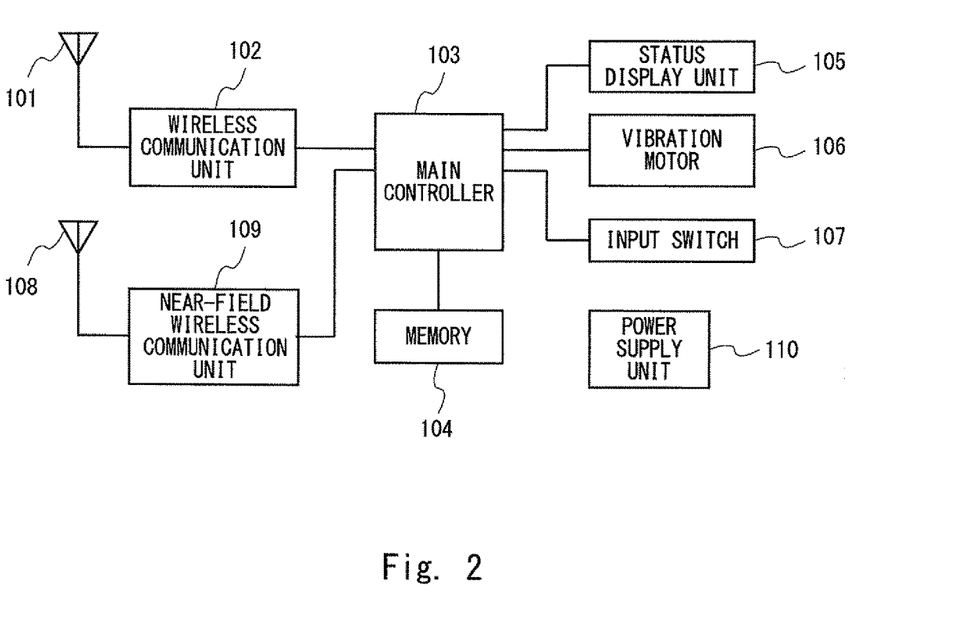
FIG. 2 is a schematic circuit block diagram showing one example of an internal configuration of the wireless communication relay apparatus in the wireless relay system shown in FIG. 1.

FIG. 2 is a schematic circuit block diagram showing one example of an internal configuration of the wireless communication relay apparatus 10 in the wireless relay system shown in FIG. 1. As shown in FIG. 2, the wireless communication relay apparatus 10 includes an antenna 101 for performing wireless communication with the base station 30, a wireless communication unit 102, a main controller 103, a memory 104, a status display unit 105, a vibration motor 106, an input switch (operational unit) 107, a near-field wireless communication antenna 108 to perform a near-field wireless communication with the wireless communication terminal 20, a near-field wireless communication unit 109, and a power supply unit 110. The status display unit 105 is able to visually indicate the operating state of the wireless communication relay apparatus 10 to the user by a light-emitting diode (LED) or a liquid crystal display (LCD).

As stated above, the wireless communication unit 102 of the wireless communication relay apparatus 10 is able to receive the voice call or the VoIP call via a local area network (LAN)-side communication network or a wide area network (WAN)-side communication network that uses the PHS system or the W-CDMA system as a wireless communication function. Since the configuration example of the wireless communication relay apparatus 10 shown in FIG. 2 as one example does not include a microphone, a speaker, and an external voice input/output control function, the wireless communication relay apparatus 10 alone cannot be used as a telephone apparatus. However, the present invention is not limited to such a configuration example and may be formed as a general mobile communication terminal apparatus including a mobile telephone or a mobile information terminal apparatus as a configuration example of another wireless communication relay apparatus.

Figure 3:
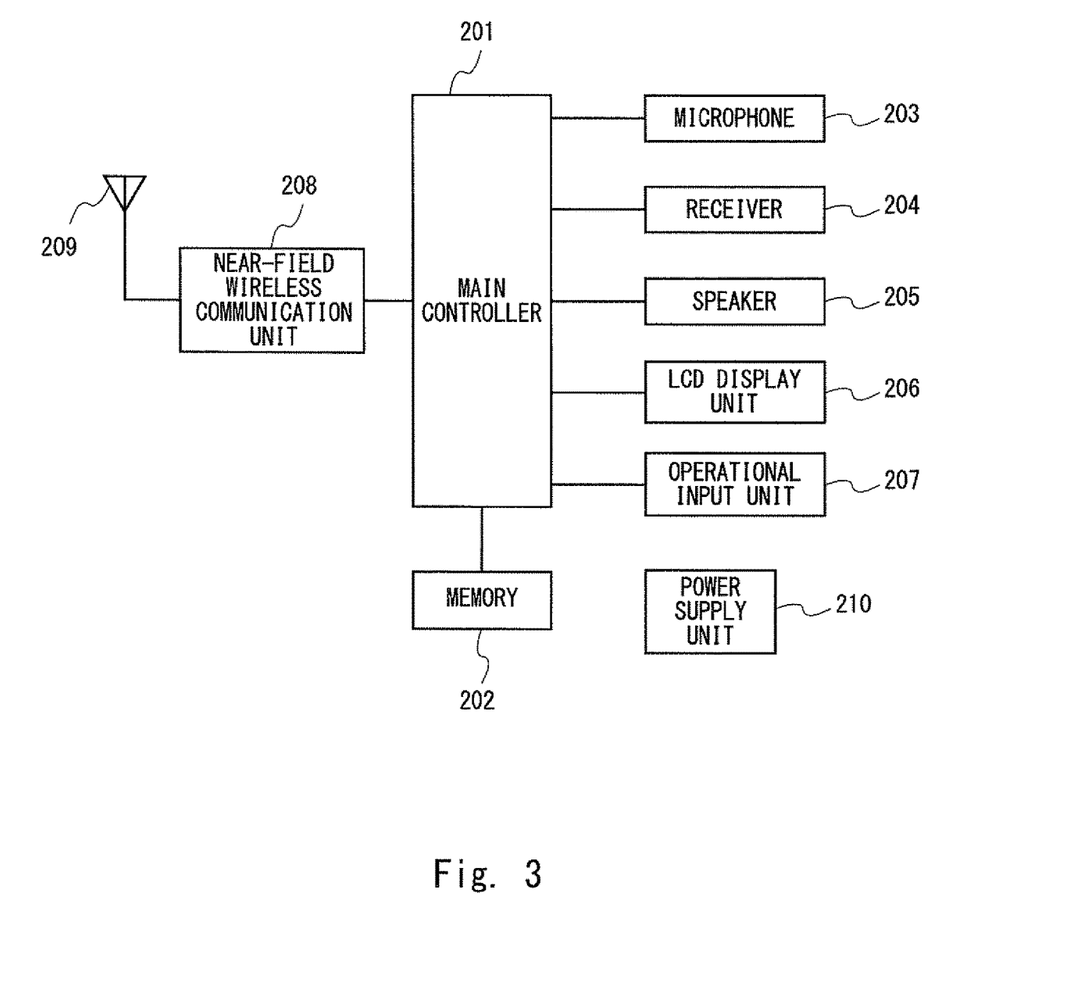
FIG. 3 is a schematic circuit block diagram showing one example of an internal configuration of the wireless communication terminal in the wireless relay system shown in FIG. 1.

FIG. 3 is a schematic circuit block diagram showing one example of an internal configuration of the wireless communication terminal 20 in the wireless relay system shown in FIG. 1. As shown in FIG. 3, the wireless communication terminal 20 includes a main controller 201, a memory 202, a microphone 203, a receiver 204, a speaker 205, an LCD display unit 206, an operational input unit 207, a near-field wireless communication unit 208 for performing the near-field wireless communication with the wireless communication relay apparatus 10, a near-field wireless communication antenna 209, and a power supply unit 210.

Description of Operations of Embodiment

Figure 4:
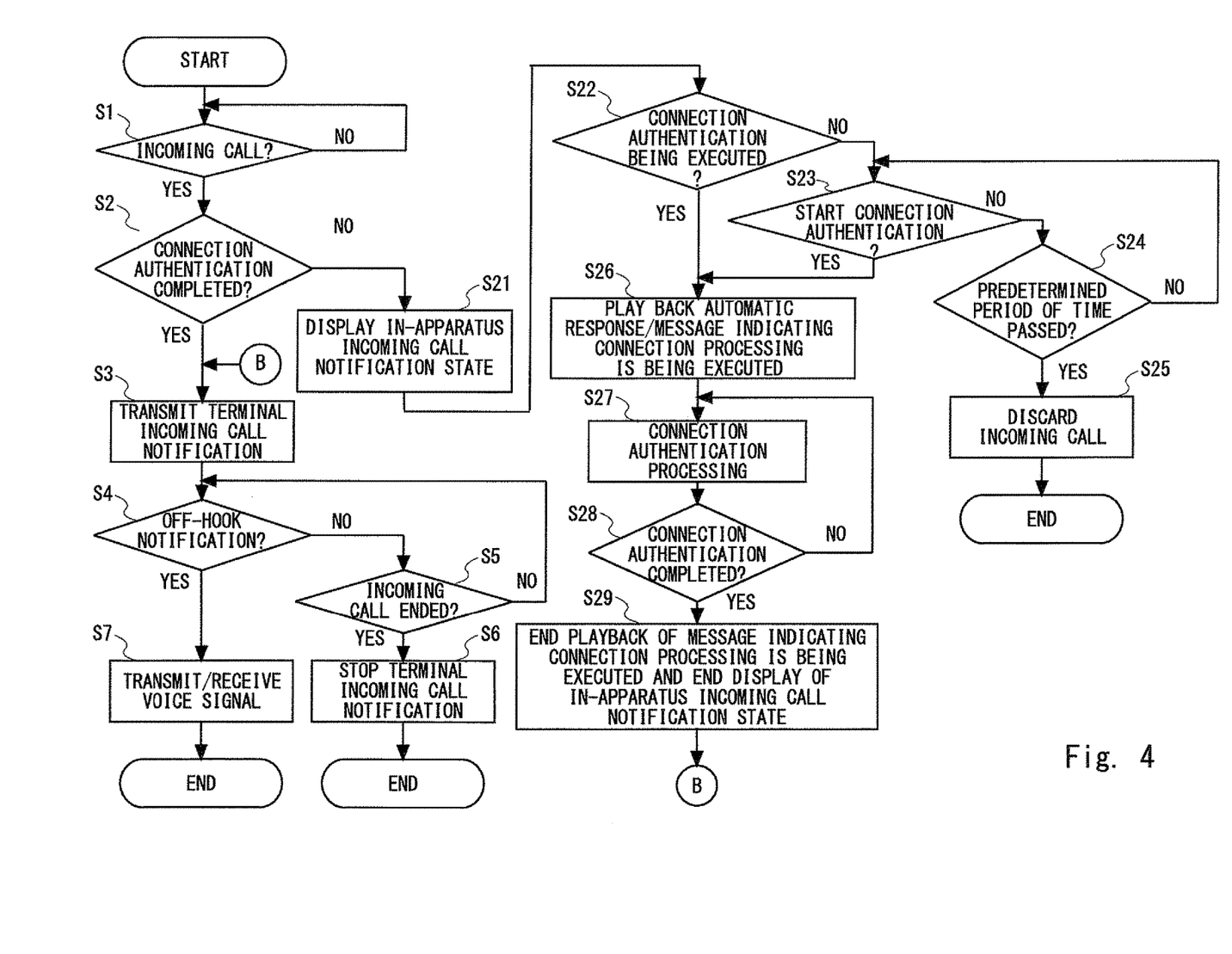
FIG. 4 is a flowchart for describing one example of operations of the wireless communication relay apparatus in the wireless relay system shown in FIG. 1.

Next, with reference to a flowchart shown in FIG. 4, an example of operations related to the wireless relay system shown in FIG. 1 as one embodiment of the present invention will be described. The main operations are operations of the wireless communication relay apparatus 10 shown in FIG. 2. FIG. 4 is a flowchart for describing one example of the operations of the wireless communication relay apparatus 10 in the wireless relay system shown in FIG. 1.

First, an outline of operations of the wireless communication relay apparatus 10 and the wireless communication terminal 20 in the wireless relay system shown in FIG. 1 will be described. In the wireless relay system shown in FIG. 1, when a connection authentication by the near-field wireless communication between the wireless communication relay apparatus 10 and the wireless communication terminal 20 using a PIN code has been completed, the wireless communication relay apparatus 10 that includes a function of performing the relay between the base station 30 and the wireless communication terminal 20 transmits or receives a voice signal and a control signal to or from the wireless communication terminal 20 via the near-field wireless communication when there is an incoming voice call or VoIP call, to thereby relay the voice call or the VoIP call to the wireless communication terminal 20 or the caller on the side of the base station 30. The wireless communication terminal 20 outputs the voice signal relayed by the wireless communication relay apparatus 10 to the receiver 204 or the speaker 205 and sends a voice to the user. Further, the voice of the user input via the microphone 203 is converted into a voice signal, the voice signal is transmitted to the wireless communication relay apparatus 10, and the voice signal is relay forwarded to the calling party, whereby the conversation is achieved.

When the wireless communication relay apparatus 10 shown in FIG. 2 receives the voice from the base station 30, the wireless communication relay apparatus 10 decodes, by the wireless communication antenna 101, the wireless communication unit 102, and the main controller 103, the signal format of the voice signal between the wireless communication relay apparatus 10 and the base station 30 (signal format of the voice signal of the voice call or the VoIP call), encodes the signal format of the voice signal into a signal format that complies with the near-field wireless communication system of the wireless communication terminal 20, and transmits the signal format after the encoding to the wireless communication terminal 20 by the near-field wireless communication unit 109 and the near-field wireless communication antenna 108. The wireless communication terminal 20 shown in FIG. 3 receives and decodes the voice signal transmitted from the wireless communication relay apparatus 10 by the near-field wireless communication antenna 209, the near-field wireless communication unit 208, and the main controller 201 and outputs the voice after it is decoded from the receiver 204 or the speaker 205.

On the other hand, the wireless communication terminal 20 shown in FIG. 3 receives the voice sent from the user of the wireless communication terminal 20 through the microphone 203, encodes the voice signal into the signal format that complies with the near-field wireless communication of the wireless communication terminal 20 by the main controller 201 or the near-field wireless communication unit 208, and transmits the signal after it is encoded to the wireless communication relay apparatus 10 by the near-field wireless communication unit 208 and the near-field wireless communication antenna 209. The wireless communication relay apparatus 10 shown in FIG. 2 receives and decodes the voice signal sent from the wireless communication terminal 20 by the near-field wireless communication unit 109 and the main controller 103, encodes the signal format of the voice signal into the signal format of the voice signal between the wireless communication relay apparatus 10 and the base station 30 (signal format of the voice signal of the voice call or the VoIP call), and transmits the signal after it is encoded from the wireless communication unit 102 and the wireless communication antenna 101 to the base station 30.

Further, when there is an incoming call for the wireless communication terminal 20 in the main controller 103, the wireless communication relay apparatus 10 checks whether the connection authentication between the wireless communication relay apparatus 10 and the wireless communication terminal 20 has been completed. When the connection authentication has not yet been completed, the wireless communication relay apparatus 10 displays information indicating that the connection authentication has not yet been completed on the status display unit 105 or vibrates the body of the wireless communication relay apparatus 10 by driving the vibration motor 106 in order to start the connection authentication. Further, when the wireless communication relay apparatus 10 detects that the user has performed the operation to start the connection authentication in the main controller 103 by the input switch 107, the wireless communication relay apparatus 10 sends a message response or a hold response indicating that the connection authentication is currently being performed and requesting the caller to wait for some time for the caller of the incoming call as a primary response to the incoming call. After that, when the connection authentication is completed in the main controller 103, the wireless communication relay apparatus 10 connects the incoming call to the wireless communication terminal 20. When the wireless communication relay apparatus 10 then detects that the wireless communication terminal 20 has gone off hook, the wireless communication relay apparatus 10 transmits an incoming call response signal to the calling party and the voice transmission/reception between the caller and the wireless communication terminal 20 is ready to start.

Next, taking a case in which there is an incoming call for the wireless communication relay apparatus 10 from the base station 30 in the wireless relay system shown in FIG. 1 as an example, with reference to the flowchart shown in FIG. 4, one example of the operations of the wireless communication relay apparatus 10 will be described in further detail.

In the flowchart shown in FIG. 4, the wireless communication relay apparatus 10 first determines whether there is an incoming call from the base station 30 (Step S1). When there is an incoming call (YES in Step S1), the process goes to the next Step S2. On the other hand, when there is no incoming call (NO in Step S1), the operation of Step S1 that checks whether there is an incoming call is repeated.

When there is an incoming call from the base station 30 and the process moves to Step S2, the wireless communication relay apparatus 10 determines whether the connection authentication (pairing) via the near-field wireless communication between the wireless communication relay apparatus 10 and the wireless communication terminal 20, which is supposed to receive the incoming call, has been completed (Step S2). When the connection authentication between the wireless communication relay apparatus 10 and the wireless communication terminal 20, which is supposed to receive the incoming call, has been completed (YES in Step S2), the process goes to Step S3, where the wireless communication relay apparatus 10 transmits a terminal incoming call notification signal using the near-field wireless communication to the wireless communication terminal 20, whereby the incoming call is sent to the wireless communication terminal 20 (Step S3).

Then the process goes to Step S4, where the wireless communication relay apparatus 10 determines whether an off-hook notification signal is transmitted from the wireless communication terminal 20 to the wireless communication relay apparatus 10 (Step S4). When the off-hook notification signal is transmitted from the wireless communication terminal 20 (YES in Step S4), the process goes to Step S7, where the wireless communication relay apparatus 10 sends back the incoming call response signal to the caller via the base station 30, whereby the operation of transmitting/receiving the voice signal between the base station 30 and the wireless communication relay apparatus 10 and between the wireless communication relay apparatus 10 and the wireless communication terminal 20 is started, whereby the voice communication is started (Step S7).

On the other hand, when the off-hook notification signal from the wireless communication terminal 20 is not detected in Step S4 (NO in Step S4), the process goes to Step S5, where it is determined whether the incoming call is ended (Step S5). When the incoming call has not yet been ended (NO in Step S5), the process goes back to Step S4, where it is continuously determined whether the off-hook notification signal has been detected. When the caller performs the disconnection operation and the incoming call has already been ended (YES in Step S5), the process goes to Step S6, where the operation of transmitting the terminal incoming call notification signal to the wireless communication terminal 20 is stopped (Step S6).

On the other hand, when it is determined in Step S2 that the connection authentication between the wireless communication relay apparatus 10 and the wireless communication terminal 20, which is supposed to receive the incoming call, has not yet been completed (NO in Step S2), the process goes to Step S21, where the status display unit 105 or the vibration motor 106 of the wireless communication relay apparatus 10 is operated and information indicating that an in-apparatus call incoming state is occurring or information indicating that the mutual connection authentication operation between the wireless communication relay apparatus 10 and the wireless communication terminal 20 should be immediately started is sent to the user of the wireless communication relay apparatus 10 using the state display or vibrations (Step S21). The status display unit 105 is able to send the above information to the user using a method of lightning or blinking the LED or a method of displaying information indicating that the in-apparatus call incoming state is occurring by the LCD.

Then the process goes to Step S22, where it is determined whether the connection authentication between the wireless communication relay apparatus 10 and the wireless communication terminal 20 is currently being executed (Step S22). When the connection authentication processing is currently being executed (YES in Step S22), the process goes to Step S26, where an automatic response to the incoming call is sent. That is, in Step S26, a voice message indicating that the connection authentication processing is currently being executed and requesting the caller to wait for some time is automatically played back or a hold tone indicating that the connection authentication processing is currently being executed is automatically played back as the primary response to the incoming call. Then the process goes to Step S27, where the connection authentication processing is continued (Step S27). After that, the process goes to Step S28, where it is determined whether the connection authentication processing has been completed (Step S28). When the connection authentication is completed (YES in Step S28), the process goes to Step S29, where the playback of the voice message indicating that the connection authentication processing is currently being executed or the playback of the hold tone for the caller is ended and the display operation indicating the occurrence of the in-apparatus call incoming state in Step S21 is ended (Step S29). After that, the process goes back to the aforementioned operation of Step S3 and the subsequent operations in order to transmit the terminal incoming call notification signal to the wireless communication terminal 20.

Further, when it is determined in Step S22 that the connection authentication processing between the wireless communication relay apparatus 10 and the wireless communication terminal 20 is not currently being executed (NO in Step S22), the process goes to Step S23, where it is determined whether the operation to start the connection authentication has been performed (Step S23). The determination regarding whether the operation to start the connection authentication has been performed may be performed, for example, by determining whether the input switch 107 of the wireless communication relay apparatus 10 has been pushed. When the operation of starting the connection authentication has already been performed (YES in Step S23), the process goes back to the aforementioned operation of Step S26 and the subsequent operations in order to play back the voice message indicating that the connection authentication processing is currently being executed or the hold tone for the caller.

On the other hand, when it is determined in Step S23 that the operation to start the connection authentication has not been performed (NO in Step S23), the process goes to Step S24, where it is determined whether a predetermined period of time set in advance has passed after the first operation in Step S23, that is, after the instruction to start the connection authentication is output (Step S24). When the predetermined period of time has passed (YES in Step S24), this means that the user is, for example, absent and thus cannot perform the operation to start the connection authentication. In this case, the process goes to Step S25, where the incoming call is treated as an incomplete call and the incoming call is discarded (Step S25). When the predetermined period of time has not yet passed in Step S24 (NO in Step S24), the process goes back to Step S23, where the operation of determining again whether there is a request to start the connection authentication is repeated.

<Supplementary Notes>

As will be clear from the detailed descriptions above, some or all of the aforementioned embodiments of the present invention may be described as shown in the following Supplementary Notes. It is needless to say, however, that the present invention is not limited to these cases.

(Supplementary Note 1)

A wireless communication relay apparatus including:

a wireless communication function that performs a wireless communication with a base station;

a near-field wireless communication function that performs a near-field wireless communication with a wireless communication terminal arranged nearby; and a function that relays a call between the base station and the wireless communication terminal, the wireless communication relay apparatus further including:

a function of outputting, when there is an incoming call from the base station and a connection authentication between the wireless communication relay apparatus and the wireless communication terminal has not yet been completed, an instruction to start the connection authentication to a user and sending a message or a hold tone indicating that the connection authentication is currently being executed to a caller of the incoming call as a primary response to the incoming call; and a function of connecting, after the connection authentication is completed, the incoming call to the wireless communication terminal and transmitting a response indicating that the communication is now ready to start to the caller when the wireless communication terminal has gone off hook.

(Supplementary Note 2)

The wireless communication relay apparatus according to Supplementary Note 1, wherein, when an operation to start the connection authentication by the user has not been performed within a predetermined period of time set in advance after the instruction to start the connection authentication to be output to the user is output, the incoming call is discarded as an incomplete call.

(Supplementary Note 3)

The wireless communication relay apparatus according to Supplementary Note 1 or 2, wherein the incoming call is one of an incoming call by a circuit switch based voice call and an incoming call by a packet communication in which a voice signal is packetized.

(Supplementary Note 4)

The wireless communication relay apparatus according to any one of Supplementary Notes 1 to 3, wherein the instruction to start the connection authentication to be output to the user is sent to the user by a state display using a light-emitting diode (LED) or a liquid crystal display (LCD) or by vibrations of a body of the wireless communication relay apparatus.

(Supplementary Note 5)

The wireless communication relay apparatus according to any one of Supplementary Notes 1 to 4, wherein:

a signal format of the signal received from the base station is converted from a signal format used between the wireless communication relay apparatus and the base station into a signal format that complies with a near-field wireless communication system between the wireless communication relay apparatus and the wireless communication terminal and the signal after the conversion is transmitted to the wireless communication terminal, and a signal format of the signal received from the wireless communication terminal is converted from the signal format that complies with the near-field wireless communication system between the wireless communication relay apparatus and the wireless communication terminal into the signal format used between the wireless communication relay apparatus and the base station and the signal after the conversion is transmitted to the base station.
(Supplementary Note 6)
The wireless communication relay apparatus according to any one of Supplementary Notes 1 to 5, wherein:
the near-field wireless communication between the wireless communication relay apparatus and the wireless communication terminal is executed based on a communication system of one of a wireless local area network (LAN) system, a Bluetooth (BT (registered trademark)) system, and a ZigBee system, and
the wireless communication between the wireless communication relay apparatus and the base station is executed based on one of a personal handy-phone system (PHS), a wireless local area network (LAN) system, a wideband-code division multiple access (W-CDMA) system, a long term evolution (LTE) system, and a worldwide interoperability for microwave access (WiMAX) system.
(Supplementary Note 7)
An automatic response method in a wireless communication relay apparatus comprising:
a wireless communication step for performing a wireless communication with a base station;
a near-field wireless communication step for performing a near-field wireless communication with a wireless communication terminal arranged nearby; and
a step of relaying a call between the base station and the wireless communication terminal, the automatic response method further comprising:
a step of outputting, when there is an incoming call for the wireless communication relay apparatus from the base station and the connection authentication between the wireless communication relay apparatus and the wireless communication terminal has not yet been completed, an instruction to start the connection authentication to a user and sending a message or a hold tone indicating that the connection authentication is currently being executed to a caller of the incoming call as a primary response to the incoming call; and
a step of connecting, after the connection authentication is completed, the incoming call to the wireless communication terminal and transmitting a response indicating that the communication is now ready to start to the caller when the wireless communication terminal has gone off hook.
(Supplementary Note 8)
The automatic response method in the wireless communication relay apparatus according to Supplementary Note 7, further comprising a step of discarding the incoming call as an incomplete call when an operation to start the connection authentication by the user has not been performed within a predetermined period of time set in advance after the instruction to start the connection authentication to be output to the user is output.
(Supplementary Note 9)
The automatic response method in the wireless communication relay apparatus according to Supplementary Note 7 or 8, wherein the incoming call is one of an incoming call by a circuit switch based voice call and an incoming call by a packet communication in which a voice signal is packetized.
(Supplementary Note 10)
The automatic response method in the wireless communication relay apparatus according to any one of Supplementary Notes 7 to 9, wherein the instruction to start the connection authentication to be output to the user is sent to the user by a state display using a light-emitting diode (LED) or a liquid crystal display (LCD) or by vibrations of a body of the wireless communication relay apparatus.
(Supplementary Note 11)
The automatic response method in the wireless communication relay apparatus according to any one of Supplementary Notes 7 to 10, wherein:
a signal format of the signal received from the base station is converted from a signal format used between the wireless communication relay apparatus and the base station into a signal format that complies with a near-field wireless communication system between the wireless communication relay apparatus and the wireless communication terminal and the signal after the conversion is transmitted to the wireless communication terminal, and
a signal format of the signal received from the wireless communication terminal is converted from the signal format that complies with the near-field wireless communication system between the wireless communication relay apparatus and the wireless communication terminal into the signal format used between the wireless communication relay apparatus and the base station and the signal after the conversion is transmitted to the base station.
(Supplementary Note 12)
The automatic response method in the wireless communication relay apparatus according to any one of Supplementary Notes 7 to 11, wherein:
the near-field wireless communication between the wireless communication relay apparatus and the wireless communication terminal is executed based on a communication system of one of a wireless local area network (LAN) system, a Bluetooth (BT (registered trademark)) system, and a ZigBee system, and
the wireless communication between the wireless communication relay apparatus and the base station is executed based on one of a personal handy-phone system (PHS), a wireless local area network (LAN) system, a wideband-code division multiple access (W-CDMA) system, a long term evolution (LTE) system, and a worldwide interoperability for microwave access (WiMAX) system.
(Supplementary Note 13)
An automatic response program that executes the automatic response method in the wireless communication relay apparatus according to any one of Supplementary Notes 7 to 12 as a program that can be executed by a computer.

Description of Effects of Embodiment

As described above in detail, in the wireless communication relay apparatus 10 and the automatic response method in the wireless communication relay apparatus 10 according to this embodiment, when there is an incoming call for the wireless communication terminal 20 from the caller in a state in which the connection authentication by the near-field wireless communication has not yet been performed between the wireless communication relay apparatus 10 and the wireless communication terminal 20, which is supposed to be the relay destination of the voice call or the VoIP call, or the connection authentication is currently being executed between them, the wireless communication relay apparatus 10 automatically sends a response message or a hold response indicating that the connection authentication is currently being executed to the caller as a primary response and causes the user of the wireless communication relay apparatus 10 to start the connection authentication between the wireless communication relay apparatus 10 and the wireless communication terminal 20 by the state display that uses the LED or LCD or vibrations, whereby it is possible to reduce the loss of communication opportunities as much as possible.

The configuration of the preferred embodiment of the present invention has been described above. It should be noted, however, that this embodiment is merely an example of the present invention and is not intended to limit the present invention. Those skilled in the art would easily understand that the present invention may be modified or changed in various ways depending on the specific application without departing from the spirit of the present invention.

While the present invention has been described as a hardware configuration in the aforementioned embodiment, the present invention is not limited to this configuration. The present invention is able to achieve desired processing by causing a central processing unit (CPU) to execute a computer program.

Further, the above program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present invention has been described above with reference to the embodiment, the present invention is not limited to the above embodiment. Various changes that may be understood by those skilled in the art may be made on the configurations and the details of the present invention within the scope of the present invention.

REFERENCE SIGNS LIST

10 WIRELESS COMMUNICATION RELAY APPARATUS
20 WIRELESS COMMUNICATION TERMINAL
30 BASE STATION
101 ANTENNA (WIRELESS COMMUNICATION ANTENNA)
102 WIRELESS COMMUNICATION UNIT
103 MAIN CONTROLLER
104 MEMORY
105 STATUS DISPLAY UNIT
106 VIBRATION MOTOR
107 INPUT SWITCH (OPERATIONAL UNIT)
108 NEAR-FIELD WIRELESS COMMUNICATION ANTENNA
109 NEAR-FIELD WIRELESS COMMUNICATION UNIT
110 POWER SUPPLY UNIT
201 MAIN CONTROLLER
202 MEMORY
203 MICROPHONE
204 RECEIVER
205 SPEAKER
206 LCD DISPLAY UNIT
207 OPERATIONAL INPUT UNIT
208 NEAR-FIELD WIRELESS COMMUNICATION UNIT
209 NEAR-FIELD WIRELESS COMMUNICATION ANTENNA
210 POWER SUPPLY UNIT

The invention claimed is:

1. A wireless communication relay apparatus including a wireless communication unit that performs a wireless communication with a base station, a near-field wireless communication unit that performs a near-field wireless communication with a wireless communication terminal arranged nearby, and a relay unit that relays a call between the base station and the wireless communication terminal, the wireless communication relay apparatus further including:
an outputting unit, when there is an incoming call from the base station, and a connection authentication between the wireless communication relay apparatus and the wireless communication terminal has not yet been completed, an instruction to start the connection authentication to a user and sending a message or a hold tone indicating that the connection authentication is currently being executed to a caller of the incoming call as a primary response to the incoming call; and
a connecting unit, after the connection authentication is completed, the incoming call to the wireless communication terminal and transmitting a response indicating that the communication is now ready to start to the caller when the wireless communication terminal has gone off hook.

2. The wireless communication relay apparatus according to claim 1, wherein, when an operation to start the connection authentication by the user has not been performed within a predetermined period of time set in advance after the instruction to start the connection authentication to be output to the user is output, the incoming call is discarded as an incomplete call.

3. The wireless communication relay apparatus according to claim 1, wherein the incoming call is one of an incoming call by a circuit switch based voice call and an incoming call by a packet communication in which a voice signal is packetized.

4. The wireless communication relay apparatus according to claim 1, wherein the instruction to start the connection authentication to be output to the user is sent to the user by a state display using a light-emitting diode (LED) or a liquid crystal display (LCD) or by vibrations of a body of the wireless communication relay apparatus.

5. The wireless communication relay apparatus according to claim 1, wherein a signal format of the signal received from the base station is converted from a signal format used between the wireless communication relay apparatus and the base station into a signal format that complies with a near-field wireless communication system between the wireless communication relay apparatus and the wireless communication terminal and the signal after the conversion is transmitted to the wireless communication terminal, and a signal format of the signal received from the wireless communication terminal is converted from the signal format that complies with the near-field wireless communication system between the wireless communication relay apparatus and the wireless communication terminal into the signal format used between the wireless communication relay apparatus and the base station and the signal after the conversion is transmitted to the base station.

6. The wireless communication relay apparatus according to claim 1, wherein:
the near-field wireless communication between the wireless communication relay apparatus and the wireless communication terminal is executed based on a communication system of one of a wireless local area network (LAN) system, a Bluetooth (BT (registered trademark)) system, and a ZigBee system, and
the wireless communication between the wireless communication relay apparatus and the base station is executed based on one of a personal handy-phone system (PHS), a wireless local area network (LAN) system, a wideband-code division multiple access (W-CDMA) system, a long term evolution (LTE) system, and a worldwide interoperability for microwave access (WiMAX) system.

7. An automatic response method in a wireless communication relay apparatus comprising:
a wireless communication step for performing a wireless communication with a base station;
a near-field wireless communication step for performing a near-field wireless communication with a wireless communication terminal arranged nearby; and
a step of relaying a call between the base station and the wireless communication terminal, the automatic response method further comprising:
a step of outputting, when there is an incoming call for the wireless communication relay apparatus from the base station and the connection authentication between the wireless communication relay apparatus and the wireless communication terminal has not yet been completed, an instruction to start the connection authentication to a user and sending a message or a hold tone indicating that the connection authentication is currently being executed to a caller of the incoming call as a primary response to the incoming call; and
a step of connecting, after the connection authentication is completed, the incoming call to the wireless communication terminal and transmitting a response indicating that the communication is now ready to start to the caller when the wireless communication terminal has gone off hook.

8. The automatic response method in the wireless communication relay apparatus according to claim 7, further comprising a step of discarding the incoming call as an incomplete call when an operation to start the connection authentication by the user has not been performed within a predetermined period of time set in advance after the instruction to start the connection authentication to be output to the user is output.

9. The automatic response method in the wireless communication relay apparatus according to claim 7, wherein the incoming call is one of an incoming call by a circuit switch based voice call and an incoming call by a packet communication in which a voice signal is packetized.

10. A non-transitory computer readable medium storing an automatic response program that executes the automatic response method in the wireless communication relay apparatus according to claim 7 as a program that can be executed by a computer.

* * * * *